United States Patent [19]
Cho

[11] Patent Number: 5,835,391
[45] Date of Patent: Nov. 10, 1998

[54] TWO-DIMENSIONAL INVERSE DISCRETE COSINE TRANSFORM APPARATUS

[75] Inventor: Seongrai Cho, Suwon, Rep. of Korea

[73] Assignee: Samsung Electronics Co., Ltd., Kyungki-Do, Rep. of Korea

[21] Appl. No.: 805,050

[22] Filed: Feb. 24, 1997

[30] Foreign Application Priority Data

Feb. 24, 1996 [KR] Rep. of Korea ............... 1996 4478

[51] Int. Cl.⁶ .................................. G06F 17/14
[52] U.S. Cl. .................. 364/725.02; 364/725.03
[58] Field of Search ............ 364/725.02, 725.03, 364/715.02; 395/307, 886; 711/171, 170; 382/233, 250

[56] References Cited

U.S. PATENT DOCUMENTS 5,053,985  10/1991  Friedlander et al. ............. 364/725.03
5,181,183   1/1993  Miyazaki ........................... 364/725
5,574,661  11/1996  Cismas ............................. 364/715.02

Primary Examiner—Tan V. Mai
Attorney, Agent, or Firm—Sughrue, Mion, Zinn, Macpeak & Seas, PLLC

[57] ABSTRACT

A two-dimensional inverse discrete cosine transform (IDCT) apparatus which has a storage section for storing inverse-quantized data having a first bit-length and IDCT-transformed data having a second bit-length in allocated storage locations having the second bit-length. An IDCT processing section is provided for receiving the data stored in the storage section in a unit of a pixel, sign-extending the data having the first bit-length to the second bit-length, and then IDCT-transforming sign-extended data to produce the IDCT-transformed data having the second bit-length. An IDCT control section is provided for receiving and storing in the storage section the inverse-quantized data having the first bit-length in a unit of a packet, reading out data stored in the storage section according to a first order, and transferring read-out data to the IDCT processing section for a one-dimensional IDCT in a first direction. The IDCT control section is also provided for rewriting in the storage section first IDCT-transformed data according to a second order, reading out rewritten data, and transferring read-out data to the IDCT processing section in a second direction. The IDCT control section is also for rewriting in the storage section second IDCT-transformed data to complete two-dimensional IDCT, and reading out by a third bit-length from the storage section two-dimensional IDCT-transformed data having the second bit-length.

14 Claims, 4 Drawing Sheets

FIG. 3

|  | column0 | column1 | column2 | column3 |  |
|---|---|---|---|---|---|
| addr0 | c00_block0 | c01_block0 | c02_block0 | c03_block0 | } row0 |
| addr1 | c04_block0 | c05_block0 | c06_block0 | c07_block0 | |
| addr2 | c10_block0 | c11_block0 | c12_block0 | c13_block0 | } row1 |
| addr3 | c14_block0 | c15_block0 | c16_block0 | c17_block0 | |
| addr4 | c20_block0 | c21_block0 | c22_block0 | c23_block0 | } row2 |
| addr5 | c24_block0 | c25_block0 | c26_block0 | c27_block0 | |
|  | c30_block0 | c31_block0 | c32_block0 | c33_block0 | |
|  | c34_block0 | c35_block0 | c36_block0 | c37_block0 | |
|  | c40_block0 | c41_block0 | c42_block0 | c43_block0 | |
|  | c44_block0 | c45_block0 | c46_block0 | c47_block0 | |
|  | c50_block0 | c51_block0 | c52_block0 | c53_block0 | |
|  | c54_block0 | c55_block0 | c56_block0 | c57_block0 | |
|  | c60_block0 | c61_block0 | c62_block0 | c63_block0 | |
|  | MSB part 32-bit header | | | | |
|  | LSB part 32-bit header | | | | |

TWO-DIMENSIONAL INVERSE DISCRETE COSINE TRANSFORM APPARATUS

BACKGROUND OF THE INVENTION

1. Field of the Invention

The present invention relates to a two-dimensional inverse discrete cosine transform (IDCT) apparatus, and more particularly to a two-dimensional IDCT apparatus whereby the cost of an associated motion picture decoding chip (MPEG chip) can be reduced. The present application is based upon Korean Application No. 96-4478, which is incorporated herein by reference.

2. Description of the Prior Art

In a motion picture transmission system, a motion picture encoding section performs discrete cosine transform (DCT), quantization, and compression coding, while a motion picture decoding section performs decompression decoding, inverse quantization, and inverse DCT, which are the processes contrary to those of the encoding section.

The conventional IDCTs of the motion picture decoding section may be implemented in hardware or software. When the conventional IDCT is implemented in software, its use is limited to personal computers and a work stations, causing heavy loads to be applied to the main central processing units. On the other hand, when the conventional IDCT is implemented in hardware, the size of the dedicated MPEG chip, which includes the IDCT processing apparatus implemented in hardware, and its manufacturing cost are increased. Moreover, a lot of time is required for design.

SUMMARY OF THE INVENTION

It is an object of the present invention to overcome the deficiencies of the conventional devices by providing a two-dimensional inverse discrete cosine transform apparatus in which a library can be effected utilizing microcells.

In order to achieve the above object, the present invention provides a two-dimensional inverse discrete cosine transform apparatus for performing two-dimensional inverse discrete cosine transform (IDCT) with respect to inverse-quantized data having a first bit-length and producing two-dimensional IDCT-transformed data. The apparatus has a storage means for storing the inverse-quantized data having the first bit-length and the IDCT-transformed data having a second bit-length in allocated storage locations having the second bit-length. An IDCT processing means is provided for receiving the data stored in the storage means in the unit of a pixel, sign-extending the data having the first bit-length to the second bit-length, and then IDCT-transforming sign-extended data having the second bit-length to produce the IDCT-transformed data having the second bit-length. An IDCT control means is provided for receiving and storing in the storage means the inverse-quantized data having the first bit-length in the unit of a packet, reading out data stored in the storage means according to a first order, and transferring read-out data to the IDCT processing means for a one-dimensional IDCT in a first direction. The IDCT control means is also for completing control of the one-dimensional IDCT in the first direction by rewriting in the storage means first IDCT-transformed data according to a second order, reading out rewritten data, and transferring read-out data to the IDCT processing means for a one-dimensional IDCT in a second direction. The IDCT control means is additionally for controlling the one-dimensional IDCT in the second direction by rewriting in the storage means second IDCT-transformed data to complete two-dimensional IDCT, and reading out by a third bit-length from the storage means two-dimensional IDCT-transformed data having the second bit-length to produce the two-dimensional IDCT-transformed data.

Brief Description of the Drawings

The above objects and advantages of the present invention will become more apparent by describing in detail a preferred embodiment thereof with reference to the accompanying drawings in which:

FIG. 3 is a view illustrating the memory mapping structure of the storage section shown in FIG. 1.

Detailed Description of the Preferred Embodiment

Figure 1:
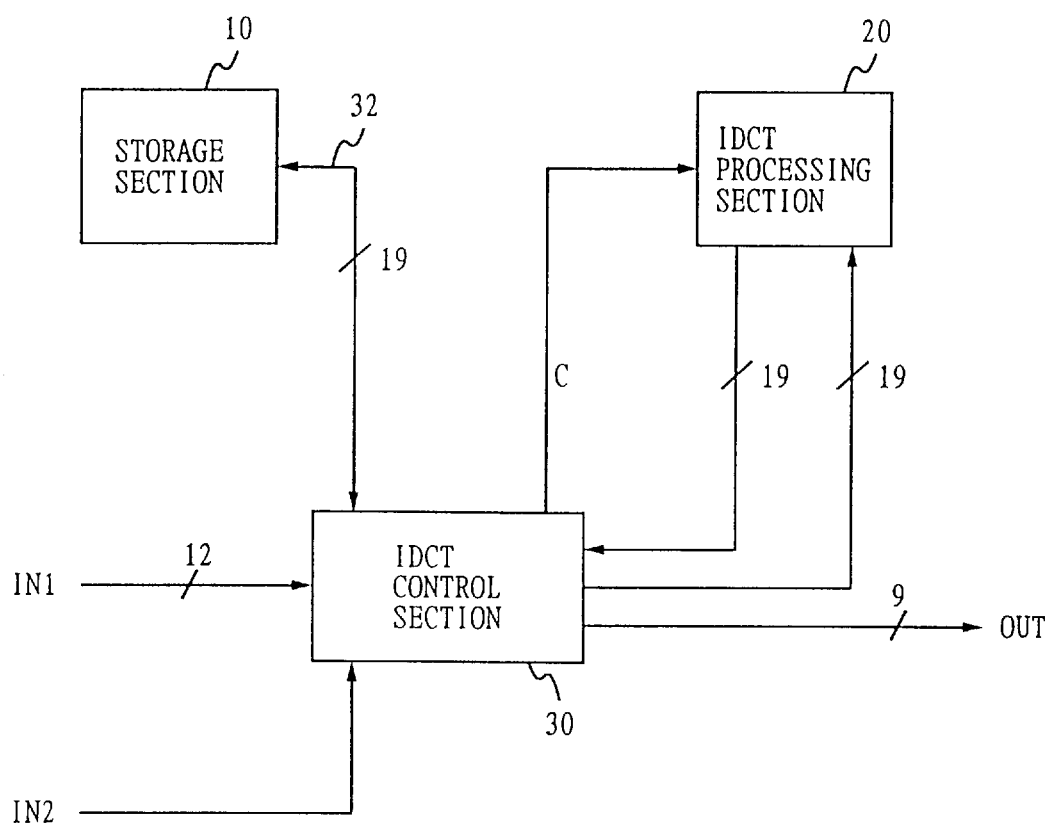
FIG. 1 is a block diagram of the IDCT apparatus according to the present invention.

Referring to FIG. 1, the IDCT apparatus according to the present invention is provided with a storage section 10 for storing in an allocated storage location having a second bit-length inverse-quantized data having a first bit-length, for example, of 12 bits, and IDCT-transformed data having a second bit-length, for example, of 19 bits. The inverse quantized data and the IDCT-transformed data are composed of a plurality of 8×8 pixel data.

An IDCT processing section 20 is provided for receiving the data stored in the storage section 10 in the unit of a pixel, sign-extending the data having the first bit-length to the second bit-length, and then IDCT-transforming sign-extended data having the second bit-length to produce the IDCT-transformed data having the second bit-length.

An IDCT control section 30 is provided for receiving and storing in the storage section 10 the inverse-quantized data having the first bit-length in the unit of a packet, reading out data stored in the storage section 10 according to a first order, and transferring read-out data to the IDCT processing section 20 to perform a one-dimensional IDCT in a first direction, i.e., in a row direction. The IDCT control section 30 is further provided for completing the control of the one-dimensional IDCT in the first direction by rewriting in the storage section first IDCT-transformed data according to a second order, reading out rewritten data, and transferring read-out data to the IDCT processing section 20 to perform a one-dimensional IDCT in a second direction, i.e. in a column direction. The IDCT control section 30 also controls the one-dimensional IDCT in the second direction by rewriting in the storage section 10 second IDCT-transformed data to complete two-dimensional IDCT, and reads out by a third bit-length from the storage section 10 two-dimensional IDCT-transformed data having the second bit-length to output the two-dimensional IDCT-transformed data.

The IDCT control section 30 receives a 12-bit inverse-quantized pixel data through its input terminal IN1 coupled to a 12-bit data bus, and outputs a two-dimensional IDCT-transformed pixel data through its output terminal OUT coupled to a 9-bit data output bus in accordance with an output demand signal inputted through its terminal IN2.

Figure 2:
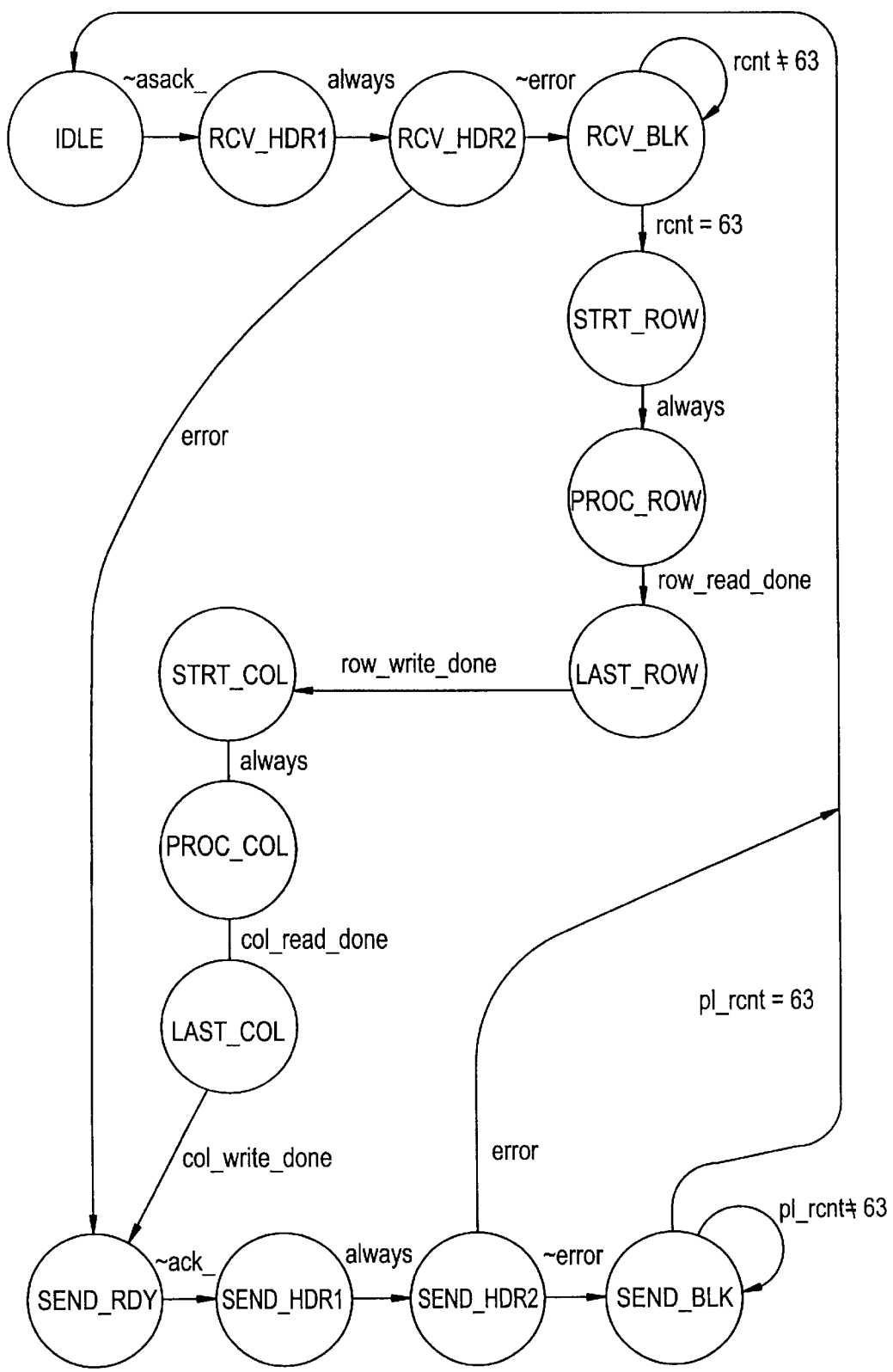
FIG. 2 is a view explaining the state of IDCT control performed by the IDCT control section shown in FIG. 1.

FIG. 2 shows the control status performed by the IDCT control section 30 in FIG. 1. The control status is composed of eight states for external interface protocol and six states for performing IDCT. The IDCT control section 30 receives and stores in the storage section 10 the inverse-quantized pixel data, and then reads out the stored data according to the first order of cx1, cx7, cx0, cx4, cx2, cx6, cx3, and cx5 to provide the stored data to the IDCT processing section 20. The IDCT control section 30 produces a 16-bit IDCT control signal C for controlling the operation of the IDCT processing section 20. After performing the IDCT, the IDCT processing section 20 stores the pixel data resulting form the IDCT in the storage section 10, and outputs the pixel data through output terminal OUT when the output demand signal is inputted through input terminal IN2.

FIG. 3 shows the memory mapping structure of the storage section, shown in FIG. 1, in which pixel data and packet header information are stored. A random access memory (RAM) implementing the storage section 10 receives from and sends to the IDCT control section 30 data through a 19-bit bidirectional bus 32. Since the two-dimensional IDCT is performed using only a RAM, data protection is required so that a row-IDCT may be first performed, and then a column-IDCT may be performed. Accordingly, a 19-bit location is required per pixel. In performing the row-IDCT first, 12-bit data inputted through the input terminal IN1 is sign-extended to 19-bit data. After performing the row-IDCT, the 19-bit resultant data is stored, so that the accuracy of the data can be maintained when the column-IDCT is performed. After both the row-IDCT and the column-IDCT are performed, only the low order nine bits of the IDCT-transformed data are outputted through terminal OUT.

Specifically, in order to perform the column-IDCT and the row-IDCT, data is read out from the RAM storage section 10 in the order of cx1, cx7, cx0, cx4, cx2, cx6, cx3, and cx5, and the read-out data is outputted to the IDCT processing section 20. After the IDCT is completed by the IDCT processing section 20, the IDCT-transformed data outputted from the IDCT processing section 20 is written in the RAM storage section 10 in the order x6, x1, x5, x0, x3, x2, x7, and x4. Addresses required for the reading and writing of the data are produced in the IDCT control section 20 in FIG. 1.

Meanwhile, information required for performing the IDCT of the header information to be stored in the RAM storage section 10 shown in FIG. 3 is stored in registers built in the IDCT control section 30, and all the header information is stored in the last two addresses of the RAM storage section 10 for data transmission.

Figure 4:
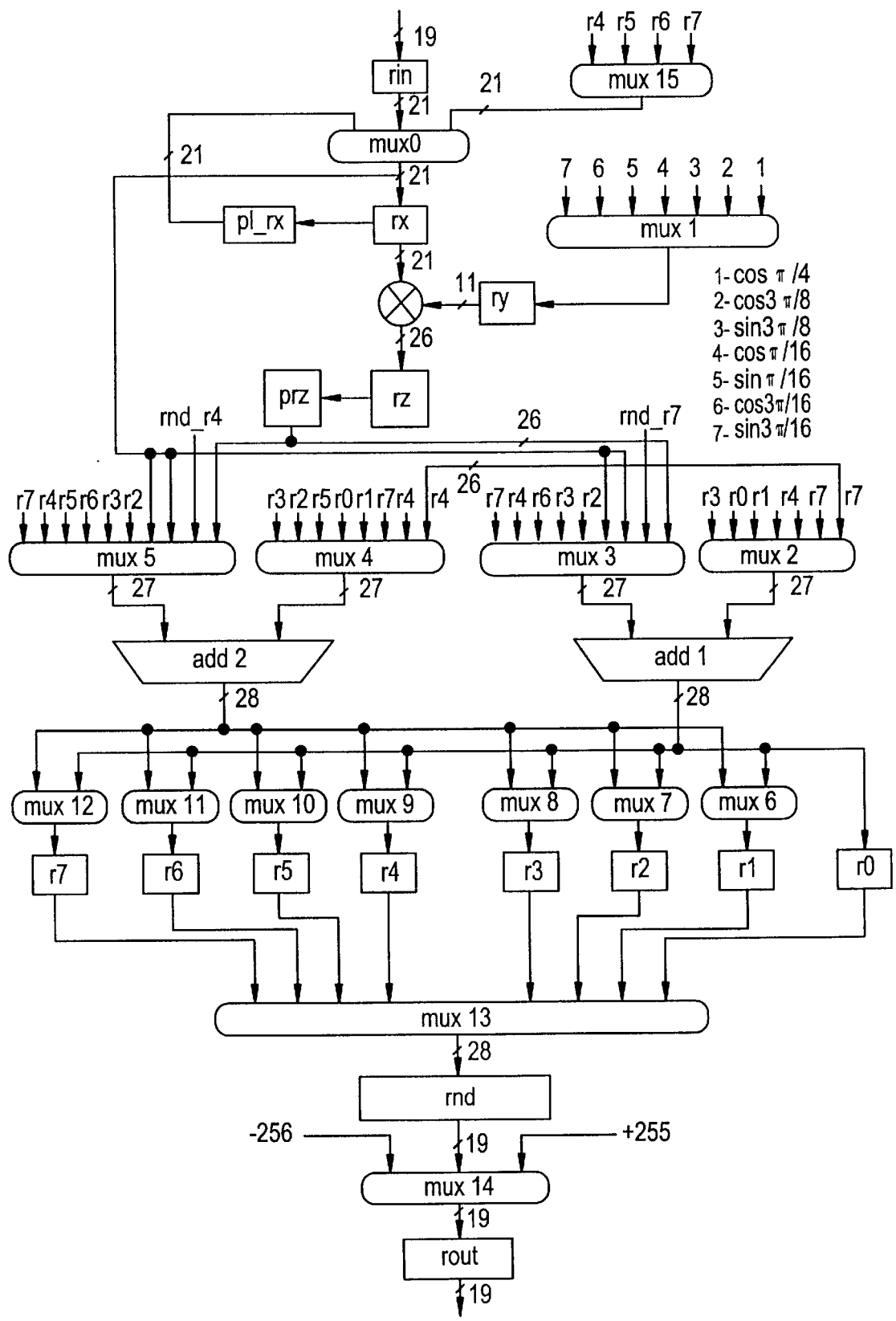
FIG. 4 is a schematic circuit diagram of the IDCT processing section shown in FIG. 1.

FIG. 4 is a circuit diagram of the IDCT processing section 20 shown in FIG. 1. The IDCT processing section 20 performs the two-dimensional IDCT by first performing the row-IDCT and then performing the column-IDCT on the resultant row-IDCT-transformed data. The two-dimensional IDCT performed by the IDCT processing section 20 is given by:

$$f(x,y)=\tfrac{1}{4}C(u)C(v)\Sigma\Sigma F(u,v) \cos[\pi(2x+1)u/16] \cos[\pi(2y+1)v/16] \quad (1)$$

where, u, v, x, y: a value among 0, 1, 2, 3, 4, 5, 6, and 7 x, y: spatial coordinates of a pixel region u, v: coordinates of a transform region In the expression (1), the variable C(u) will be $1/\sqrt{2}$ when u is "0", the variable C(v) will be $1/\sqrt{2}$ when v is "0", and otherwise, both variables C(u) and C(v) will be "1".

The expression (1) can be realized by performing the one-dimensional IDCT twice, i.e., first the row-IDCT, and then the column-IDCT. Specifically, the apparatus according to the present invention performs the two-dimensional IDCT given by the expression (1) by performing the one-dimensional IDCT for the row and the column, respectively, which is given by:

$$f(x)=\tfrac{1}{2}C(u)\Sigma F(u) \cos[\pi(2x+1)u/16] \quad (2)$$

To perform the IDCT, two clock cycles are required for one pixel. Thus, the total number of clock cycles required for processing 8×8 pixels is 434—the input transmission requires 69 clock cycles, the IDCT requires 294 clock cycles, and the output transmission requires 71 clock cycles. The 294 clock cycles required for performing the IDCT is 2(row-IDCT, and column-IDCT)×(2 cycle/pixel×64 pixel/block+19 clock cycles for the processor's waiting time). Accordingly, the time required for processing 64 pixels will be $434\times20\times10^{-9}$ seconds=8.68 microseconds($\mu$s).

The design of the present apparatus as described above satisfies the IEEE 91180/D3 standard, which is incorporated herein by reference. In a system using a 50MHz clock signal, MPEG-1 decoding (CIF 4:2:2 Format) can be performed using one apparatus of the present invention, while MPEG-2 decoding (CCIR 601 4:2:2 Format) can be performed using three apparatuses of the present invention.

From the foregoing, it will be apparent that the IDCT transform apparatus according to the present invention has optimal size and functional ability, and a reduced cost of an associated chip when the chip is a dedicated MPEG chip. Further, since a library can be effected using microcells to enable extension according to its performance capability, the time required for the design of the chip can be reduced, and thus can be adopted in many applications without limit.

While the present invention has been described and illustrated herein with reference to the preferred embodiments thereof, it will be understood by those skilled in the art that various changes in form and details may be made therein without departing from the spirit and scope of the invention.

What is claimed is:

1. A two-dimensional inverse discrete cosine transform apparatus for performing two-dimensional inverse discrete cosine transform (IDCT) on inverse-quantized data having a first bit-length and producing two-dimensional IDCT-transformed data, comprising:

storage section for storing said inverse-quantized data having said first bit-length and said IDCT-transformed data having a second bit-length in allocated storage locations having said second bit-length;

IDCT processor for receiving said data stored in said storage section in a unit of a pixel, sign-extending said data having said first bit-length to said second bit-length, and then IDCT-transforming the sign-extended data having said second bit-length to produce said IDCT-transformed data having said second bit-length; and IDCT controller for receiving and storing in said storage section said inverse-quantized data having said first bit-length in a unit of a packet, reading out said inverse-quantized data stored in said storage section according to a first order, and transferring read-out data to said IDCT processor for a one-dimensional IDCT in a first direction, said IDCT controller further completing control of said one-dimensional IDCT in said first direction by rewriting in said storage section the first IDCT-transformed data according to a second order, reading out the rewritten data, and transferring the read-out rewritten data to said IDCT processor for a one-dimensional IDCT in a second direction, said IDCT controller further controlling said one-dimensional IDCT in said second direction by rewriting in said storage section second IDCT-transformed data to thereby complete two-dimensional IDCT, and reading out by a third bit-length from said storage section the two-dimensional IDCT-transformed data having said second bit-length to output said two-dimensional IDCT-transformed data.

2. A two-dimensional inverse discrete cosine transform apparatus as claimed in claim 1, wherein said first bit-length is 12 bits.

3. A two-dimensional inverse discrete cosine transform apparatus as claimed in claim 1, wherein said second bit-length is 19 bits.

4. A two-dimensional inverse discrete cosine transform apparatus as claimed in claim 1, wherein said third bit-length is 9 bits.

5. A two-dimensional inverse discrete cosine transform apparatus as claimed in claim 1, wherein said storage section comprises a random access memory, and wherein a word is more than 19 bits.

6. A two-dimensional inverse discrete cosine transform apparatus as claimed in claim 5, wherein header information per packet is stored in two last addresses of said random access memory.

7. A two-dimensional inverse discrete cosine transform apparatus as claimed in claim 1, wherein said IDCT controller includes registers for storing information required for said IDCT of header information.

8. A method for performing two-dimensional inverse discrete cosine transform (IDCT) on inverse-quantized data having a first bit-length and producing two-dimensional IDCT-transformed data, comprising the steps of:

storing said inverse-quantized data having said first bit-length in a unit of a packet in a storage section in allocated storage locations having said second bit-length;

reading out data stored in said storage section according to a first order;

sign-extending said data having said first bit-length to said second bit-length;

performing one-dimensional IDCT on said read-out data in a first direction;

rewriting in said storage section the first IDCT-transformed data according to a second order;

reading out the rewritten data;

performing one-dimensional IDCT on said read-out rewritten data in a second direction;

rewriting in said storage section the second IDCT-dimensional transformed data to thereby complete two-dimensional IDCT;

reading out by a third bit-length from said storage section the two-dimensional IDCT-transformed data having said second bit-length to output said two-dimensional IDCT-transformed data.

9. A method as claimed in claim 8, wherein said first bit-length is 12 bits.

10. A method as claimed in claim 8, wherein said second bit-length 19 bits.

11. A method as claimed in claim 8, wherein said third bit-length is 9 bits.

12. A method as claimed in claim 8, wherein said storage section comprises a random access memory, and wherein a word is more than 19 bits.

13. A method as claimed in claim 12, further comprising the step of storing header information per packet in two last addresses of said random access memory.

14. A method as claimed in claim 8, further comprising the step of storing information required for said IDCT of header information.

* * * * *